April 23, 1963
H. D. BLACK
3,086,466
QUICK CONNECTOR
Filed April 20, 1961
2 Sheets-Sheet 1
Fig.1.
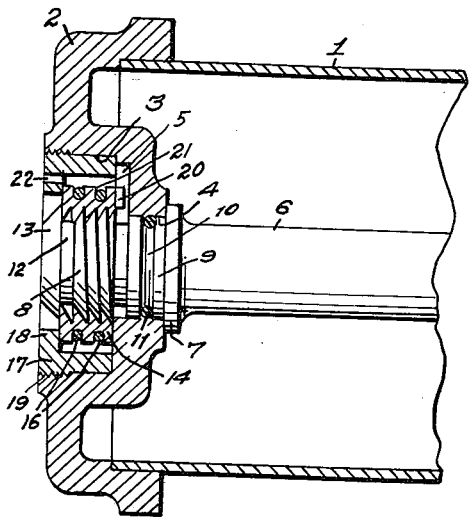
Fig.2.
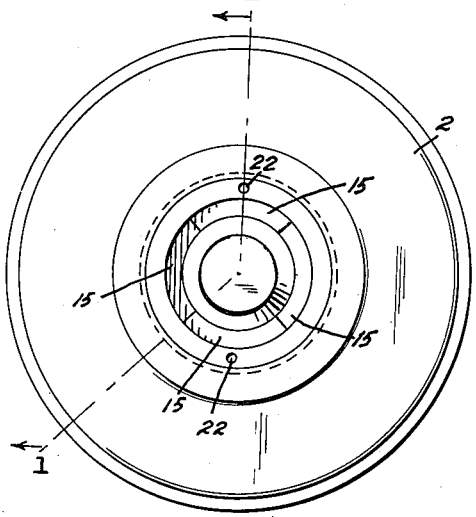
Fig.3.
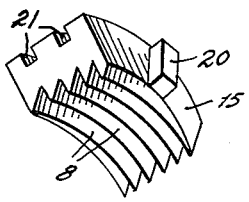
Fig.4.
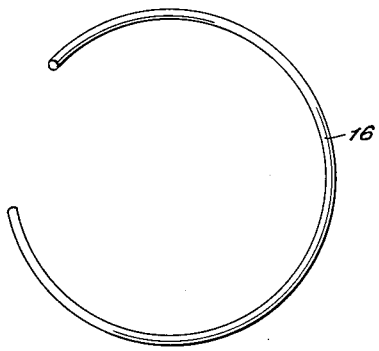
Fig.5.
INVENTOR.
Harold D. Black
BY
S.J. Rotondi & A.J. Dupont April 23, 1963  H. D. BLACK  3,086,466
QUICK CONNECTOR
Filed April 20, 1961  2 Sheets-Sheet 2

INVENTOR.
Harold D. Black
BY
S. J. Rotondi & A. J. Dupont

United States Patent Office 3,086,466
Patented Apr. 23, 1963

3,086,466
QUICK CONNECTOR
Harold D. Black, 8015 15th Ave., Hyattsville, Md., assignor, by mesne assignments, to the United States of America as represented by the Secretary of the Army
Filed Apr. 20, 1961, Ser. No. 93,009
5 Claims. (Cl. 102—44)

This invention relates to a quick connector and more particularly to a device for joining an igniter tube to the cartridge case of a rocket and to permit quick assembly under field conditions.

The connector of the invention is for use in rocket-type ammunition which is used in an automatic rocket launcher wherein the cartridge case forms the launching tube of the rocket, the said connector also furnishing a better gas seal at the connection.

Previous attempts to provide an efficient connector have met with failure. A snap ring was used, but failed when the tensile load reached 9,000 pounds, which, while adequate, produced another disadvantage in that disassembly was prevented by a plastic flow in the snap-ring face on the igniter tube, even though the ring had been heat treated to 140,000 p.s.i. yield strength.

In order to provide an efficient connector, consideration was given to the following conditions:

(a) A high pressure mechanical seal to prevent the leakage of powder gas.

(b) A connector that will not become loose when subjected to severe vibration.

(c) To safely withstand a load of 3,000 pounds imposed at shot-start pressure.

(d) A device that is simple and easily manufactured.

(e) The igniter tube should be easily disassembled from the cartridge case after the rocket has been fired.

The present invention is desired to eliminate all the aforesaid disadvantages while incorporating all of the aforementioned considerations. The sealing is accomplished by the pressure developed at a metal-to-metal seal when the igniter tube is tightened. This is accomplished by providing a split nut type connector, the nut parts being held together by circular wire springs prevented from accidental turning by means carried by the recess in the cartridge case head.

It is an important object of the invention to provide a quick connector for connecting the igniter tube of a rocket to the cartridge case, the connector providing a gas tight, metal to metal seal between the igniter tube and the cartridge case.

It is another object of the invention to provide a connector that will not become loose due to vibration.

Still another object of the invention is to provide a connector easy of assembly and disassembly and simple in construction.

With these and other objects in view which will become apparent as the specification develops, reference is made to the drawing forming a part of the specification wherein:

FIG. 1 is a fragmentary axial section through a cartridge taken along line 1—1 of FIG. 2 and showing the connector of the invention in assembled relation therewith;

FIG. 2 is an end view of the device of FIG.1;

FIG. 3 is a perspective view of a segment of the split nut;

FIG. 4 is a perspective view of a wire spring employed to hold the parts of the split nut together;

FIG. 5 is an end view on a reduced scale of the cartridge case head, the connector being removed to show the radial slots;

Figure 6:
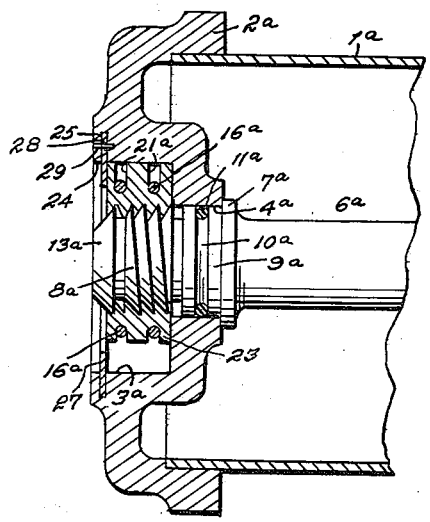
FIG. 6 is a view similar to FIG. 1, taken along line 6—6 of FIG. 7 and showing a modified form of the invention.

Referring to the drawings, 1 represents a cartridge tube which forms the firing chamber of a rocket launcher (not shown). The tube 1 has a head fixed at one end thereof and is provided with an internal annular recess 3. The floor of recess 3 is pierced by an axial bore 4 and the outer side of the floor is provided with radial grooves 5 (see FIG. 5).

The igniter tube shaft is designated by 6 and extends through bore 4 and into recess 3 when in assembled position. The shaft 6 is provided with a flange 7 which acts as a stop for limiting the movement of the shaft into recess 3.

The end of the shaft that extends into the recess 3 is provided with a series of buttress threads 8.

An enlarged portion 9 is formed integrally in shaft 6 adjacent the end of flange 7 and is substantially the same diameter as bore 4 for a snug fit therein and is further provided with an annular groove 10 to receive an O-ring 11 acting to seal between the portion 7 and bore 4.

Shaft 6 is provided with an annular groove 12 between buttress threads 8 and an enlarged beveled head portion 13 to aid against separation of the assembly due to vibration.

A split nut 14 having four segments 15 is received around threads 8 and the segments 15 are held together by wire springs 16 encircling them.

A collar 17 having a flange 18 is threadably engaged in recess 3 by threads 19.

To prevent accidental turning of the nut 14, each segment 15 is provided on one side with an integral lug 20 which fits in the respective grooves 5 when the device is assembled.

Each segment 15 is provided with a pair of grooves 21 for receiving the wire springs 16.

To facilitate assembly or disassembly of the device, collar 17 is provided with a pair of recesses 22 for the purpose of insertion of a two pronged wrench (not shown).

Assembly of the device is simple. The rocket (not shown) is dropped into tube 1 and the shaft 6 is extended through bore 4 until flange 7 abuts the head 2. The split nut 14, held together by wire springs 16 is screwed over buttress threads and the lugs 20 will seat in the radial grooves 5. Collar 17 is then screwed into recess 3 by inserting a spanner wrench having a pair of prongs (not shown) inserted in recess 22 and turning the collar. Flange 18 will abut the outer surface of the split nut 14 and prevent axial movement of shaft 6.

Figure 7:
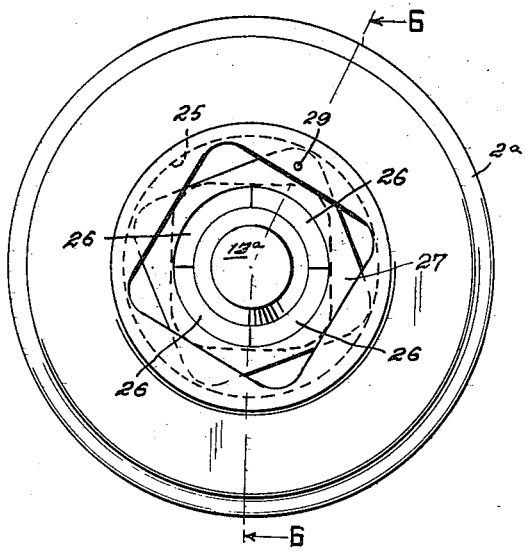
FIG. 7 is an end view of the device of FIG. 6.

A modified form of the invention is illustrated in FIGS. 6 and 7 and is essentially similar to that shown in FIGS. 1–5, the difference being in the manner of retaining the split nut.

Elements that are similar to those of FIGS. 1–5 are designated by "a."

The split nut 23 is square and recess 24 is also square and has an annular groove 25 formed in its wall, the 25 being spaced from the outer end of head 2.

Nut 23 is composed of four segments 26 and is held together by wire springs 16a which are nested in annular grooves 21a and holds the segments 26 together.

A square plate 27, having a hole 28 in one corner, is inserted through square recess 24 and pushed into position and then turned until its corners enter groove 25. A pin 29 is inserted through body 2a and hole 28 to anchor the plate 27 against turning.

Figure 8:
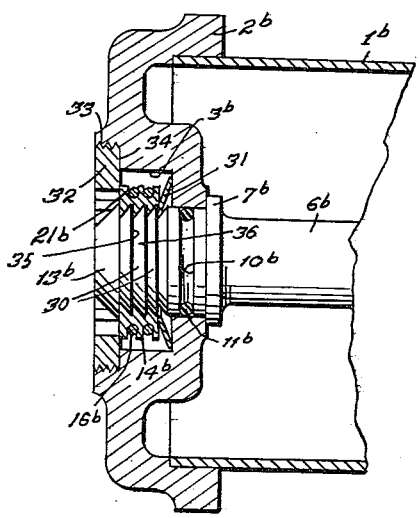
FIG. 8 is a view similar to FIG. 6 of still another embodiment of the invention.
Figure 9:
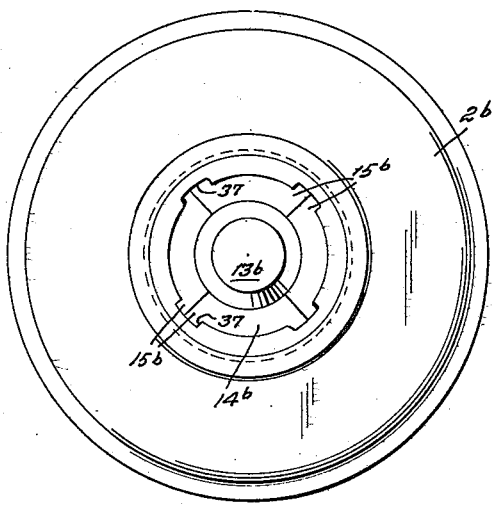
FIG. 9 is an end view of the connector of FIG. 8.

A still further species of the invention is illustrated in FIGS. 8 and 9 wherein threads are not provided on the end of the igniter tube shaft 6 but rather several circular grooves 30 are employed instead.

A spring washer 31 biases between the split nut 14b and the floor of recess 3b to prevent nut 14b against turning. A ring 32 is threadably engaged as at 33 in a threaded counterbore 34 to prevent the assembled nut 14b from axial displacement.

All other parts in FIGS. 8 and 9 which are similar to those of FIGS. 1–7 are designated by "b."

To assemble the connector shown in FIGS. 8 and 9, the nut 14b, having segments 15b held together by wire springs 16b in grooves 21b is pressed over grooves 30 until seated against washer 31, then ring 32 is screwed into threaded counterbore 34 and the assembly is complete. Ring 32 is provided with notches 37 for insertion of a wrench (not shown) for assembly.

Grooves 30 are of the buttress type, having a wall 35 that is normal to the longitudinal axis of shaft 6b and on beveled wall 36.

Variations and modifications may be effected without departing from the scope of the novel concept of the present invention.

What is claimed is:

1. A quick connector for joining an igniter tube of a rocket to a cartridge case, said case including a tube and a head secured to said tube, there being an axially disposed recess in said head and a central bore between said recess and said case, the igniter tube of the rocket being normally received in said head whereby a portion thereof extends into said recess in said head to a distance flush with the end of said head, said igniter tube having a series of external buttress threads on the extended portion, a split nut having symmetrical segments encircling the extended portion of said igniter tube, said split nut having a series of annular grooves on its outer peripheral surface, and a series of internal buttress threads on its inner peripheral surface for engagement with said external buttress threads on the extended portion of said igniter tube, a circular spring wire nested in each groove for holding the split nut segments in assembled relation on said igniter tube, means carried by said segmented nut and said head for preventing turning of said segmented nut on said igniter tube, detachable means securable in said head for preventing axial displacement of said nut and sealing means sealing between said tube and said bore.

2. A quick connector as claimed in claim 1 wherein said means for preventing turning of said segmented nut comprise an integral lug on each segment of said nut and a series of radially disposed grooves, equal in number to the number of said lugs, in the floor of said recess in said head, said grooves being normally in opposed relation with said lugs on said nut and each said groove adapted to receive a respective lug therein.

3. A quick connector as claimed in claim 1 wherein said detachable means for preventing axial movement of said nut comprise a collar having an inwardly extending annular flange, said collar being threadably received in said recess in said head whereby said flange will abut said segmented nut.

4. A quick connector as claimed in claim 1 wherein said means for preventing axial movement of said nut comprise an annular groove in wall of said recess and a square plate, said plate adapted to be rotated whereby the corners of said square plate enter said groove and retain said nut.

5. A quick connector as claimed in claim 1 wherein said sealing means between said tube and said bore comprise an enlarged portion on said tube disposed in said bore, there being an annular groove in said enlarged portion and an O-ring nested in said groove.

References Cited in the file of this patent

UNITED STATES PATENTS

| | | |
|---|---|---|
| 2,394,249 | McGahey | Feb. 5, 1946 |
| 2,664,023 | Mugford | Dec. 29, 1953 |
| 2,872,864 | Barnes et al. | Feb. 10, 1959 |

FOREIGN PATENTS

| | | |
|---|---|---|
| 628,297 | France | June 27, 1927 |